May 11, 1948. W. EWALD 2,441,476
REINFORCED STRUCTURAL SHEET
Filed Aug. 10, 1944
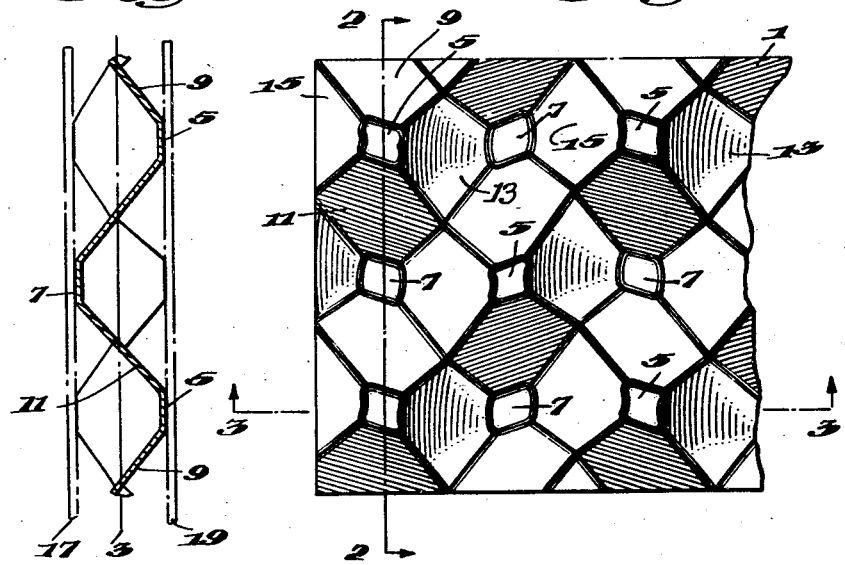
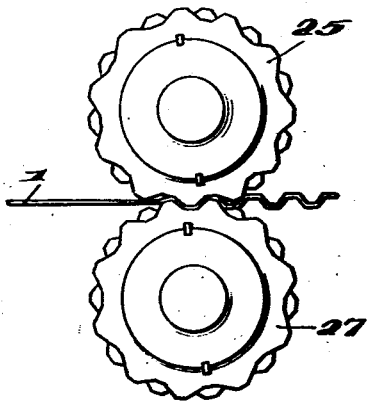
Inventor
WILLIAM EWALD Patented May 11, 1948

2,441,476

UNITED STATES PATENT OFFICE 2,441,476

REINFORCED STRUCTURAL SHEET

William Ewald, Baltimore, Md., assignor to The Glenn L. Martin Company, Middle River, Md., a corporation of Maryland Application August 10, 1944, Serial No. 548,885

1 Claim. (Cl. 29—180)

This invention relates to a reinforced structural sheet and to a method of preparing such a sheet. It is common practice in various industries, particularly in aircraft manufacture, to corrugate, dimple or indent sheets in one or more directions to secure additional structural strength in the sheet, but such sheets do not have increased strength in all directions, but only in the direction of the corrugations and are weakened in the other directions. Structural sheets as heretofore processed have failed to produce a construction which is stronger in flexure and torsion in all directions than plain flat sheets of the same size and weight per unit of projected area, and in fact, these prior attempts are at certain points in their cross-section only slightly wavy above and below the median line of the sheet. Consequently the displacement of the projected areas from the median plane of these sheets is substantially zero and the overall deflection across the sheet under flexural or torsional loading will be no better than a continuous plain flat sheet across an equal span.

By the present invention a flat or curved panel of considerable area can be produced whereby the strength is increased in all directions. Where desired the sheet manufactured in accordance with this invention can be used alone or a plain sheet may be spot welded or otherwise attached to one side thereof, or the processed sheet may form a filler between two flat sheets on either side thereof to give a high strength-weight ratio panel. While the invention is useful in all types of structures, such as airplanes, ships, houses and the like, its particular aptitude is found in the aircraft industry where a high strength-weight ratio is most desirable, such as in the shell or covering on the aircraft wings, bulkheads and fuselages. The structurally improved sheet produced by this invention has relatively high capacity to carry longitudinal compressive loads, tensile loads, flexural loads, sheer loads and torsional loads, in all directions, without serious deformation, buckling or wrinkling. Structural sheets either with or without a plain surface sheet or sheets attached thereto, are readily attachable to the supporting structure, and such sheets afford relatively high resistance to vibration fatigue, resistance to the transmission of noise and resistance to dents, such as those caused by flying stones picked up by the propeller and landing gear of aircraft, and as previously mentioned the sheets are economically and easily manufactured.

The prior art is replete with vain attempts to corrugate or indent structural sheets to improve their structural characteristics by the use of various forms of configurations, dimples, corrugations or the like, but none of these prior attempts have been satisfactory in practice.

Primarily the present invention comprises rolling or pressing a sheet of proper gauge material, such as an aluminum alloy, in a press, or passing the sheet between rollers whereby alternate elevations and depressions are formed along the longitudinal and transverse directions. The particular conception of elevations and depressions in the sheet lying both above and below the neutral or original plane of the sheet in staggered relationship is the salient feature of this invention. As will be further described in detail, the preferred form or shape of each depression and elevation is essentially a frustrum of a right pyramid whose base is parallelogram-shaped and lies approximately in the original plane of the sheet. Each elevation and depression when viewed in plan as in Fig. 1, is a frustum with two opposite slanted faces of the frustum curved with the concave side up. This curvature is approximately spherical and is continuous on the opposite sides of the adjacent inverted frustums, while the other opposite sides thereof may be planar, or they too may be curved either concave or convex if desired. These opposite curved faces are preferably those lying parallel to the vertical or lengthwise direction of the sheet, and the elevated and indented sections are arranged in zig-zag or staggered direction across the face of the sheet, and thus a structural sheet is formed that possesses increased strength in all directions. There is no straight fold line in the median plane or any other plane. By this is meant that if any force tends to fold the sheet the line of fold must necessarily follow the crooked path determined by the irregular wavy form of the sheet effected by the shape and staggered arrangement of the deformations formed therein.

In the drawings:

Fig. 1 is a plan view of a portion of a finished sheet showing the alternate elevated and depressed parallelogram-shaped frustums of pyramids;

Fig. 2 is a vertical section taken on line 2—2 of Fig. 1 with the central structural sheet secured between two exterior plain surfaces;

Fig. 3 is a transverse vertical section showing the elevations and depressions of frusto pyramid form wherein the opposite walls thereof are curved;

Fig. 4 is a diagrammatic illustration of a pair of identical adjustable male and female rolls for forming a sheet embodying this invention by passing a plain sheet therebetween.

The sheet 1 produced is of sufficient thickness for the particular purposes required, it being understood that any thickness metal can be processed within the limits of the press or embossing machinery used. Essentially the improved structural pattern embossed on both sides of the original median plane 3 of the sheet comprises a plurality of alternate, staggered, substantially parallelogram-shaped and flat topped elevations 5 and similar depressions 7.

The parallelogram-shaped, flat topped elevations and depressions 5 and 7 are alternately disposed in a plane parallel to and equally spaced from the median plane 3 of the sheet and connected to each other by larger areas intersecting the median plane at an angle.

As shown in Fig. 2, the connecting areas lying co-extensive with one set of ordinates taken on line 2—2 of Fig. 1 are planar, as indicated by numerals 9 and 11, although it will be understood that when desired these connecting areas may be concave or convex.

As shown in Fig. 3, the connecting areas lying co-extensive with the set of ordinates taken on line 3—3 of Fig. 1 are curved, as indicated by numerals 13 and 15. The curved portions 13 and 15 of two of the connecting areas serve to form arched load bearing areas suited for carrying loads placed transverse of the sheet and their curved form is readily formed as the metal is passed through roller type dies.

In Fig. 2 the structural sheet is shown sandwiched between two exterior plain sheets 17 and 19. These sheets may be spot welded or otherwise attached to the substantially flat elevations and depressions 5 and 7. In Fig. 3 the processed or structural sheet is shown as being provided with a single plain sheet 21 similarly affixed thereto.

Each elevation 5 and depression 7 is essentially a frustum of right pyramid whose base is parallelogram-shaped and lies approximately in the neutral original plane of the sheet, and as before stated each elevated frustum has two opposite faces 13 and 15 curved with the concave side up, this curvature being approximately spherical and is continuous on the adjacent sides of the adjacent depressions 7. The other opposite joining faces 9 and 11 are shown as planar surfaces, although the invention is not so limited and an improved structure may be formed when these surfaces are curved either concave or convex.

Thus in the preferred form illustrated each of the flat areas 5 and 7 are joined to adjacent areas by alternate pairs of opposing planar surfaces and by alternate pairs of arcuate surfaces. The opposed planar surfaces 9 and 11 and arcuate surfaces 13 and 15 interconnecting parallelograms 5 and 7 are hexagonally shaped. The curved faces or surfaces 13 and 15 are shown lying parallel to the vertical or lengthwise direction, and are for the purpose of obtaining efficient sections in the transverse direction. In preparing the sheets they are run between adjustable rolls 25 and 27, and preferably the sheet is rolled in the direction with the curved faces 13 and 15. It has been found that all sections will be efficient in the lengthwise direction or the direction of rolling, because of the zig-zag or staggered direction of the flat faces 9 and 11 and efficient in the crosswise direction or transverse to the sheet, because of the curved surfaces of portions 13 and 15 of the parallelogram-shaped frustums.

I claim:

A continuous imperforate reinforced metallic structural sheet having a plurality of flat topped, alternately elevated and depressed frustums formed with two opposed walls having plane slant surfaces and two opposed walls having curved slant surfaces interconnecting said frustums formed as pyramid-like projections displaced from the median plane of the said sheet with the flat tops of said frustums disposed in planes parallel to the median plane of the sheet, and the said curved slant walls of the frustums forming a series of straight juncture lines with the adjacent plane slant walls, each of said juncture lines disposed at an angle with respect to the next adjacent juncture line of the series.

WILLIAM EWALD.

REFERENCES CITED

The following references are of record in the file of this patent:

UNITED STATES PATENTS

| Number | Name | Date |
|---|---|---|
| 107,752 | Barker | Sept. 27, 1870 |
| 213,635 | Drache | Mar. 25, 1879 |
| 1,000,694 | Schaefer | Aug. 15, 1911 |
| 1,154,254 | Lachman | Sept. 21, 1915 |
| 1,499,985 | Kirsch | July 1, 1924 |
| 1,995,057 | Ellis | Mar. 19, 1935 |
| 2,292,372 | Gerlach | Aug. 11, 1942 |

FOREIGN PATENTS

| Number | Country | Date |
|---|---|---|
| 221,393 | Germany | Apr. 20, 1910 |
| 468,180 | Great Britain | June 30, 1937 |